(12) United States Patent
Duggleby

(10) Patent No.: US 12,281,627 B2
(45) Date of Patent: Apr. 22, 2025

(54) ROCKET ENGINE SYSTEMS WITH A SUPERCRITICAL COOLANT

(71) Applicant: Venus Aerospace Corp., Houston, TX (US)

(72) Inventor: Andrew Thomas Duggleby, Friendswood, TX (US)

(73) Assignee: Venus Aerospace Corp., Houston, TX (US)

( * ) Notice: Subject to any disclaimer, the term of this patent is extended or adjusted under 35 U.S.C. 154(b) by 0 days.

(21) Appl. No.: 18/151,385

(22) Filed: Jan. 6, 2023

(65) Prior Publication Data
US 2024/0093662 A1    Mar. 21, 2024

Related U.S. Application Data

(63) Continuation-in-part of application No. 17/561,621, filed on Dec. 23, 2021.

(60) Provisional application No. 63/130,586, filed on Dec. 24, 2020.

(51) Int. Cl.
    *F02K 9/00*      (2006.01)
    *F02K 9/64*      (2006.01)

(52) U.S. Cl.
    CPC . *F02K 9/00* (2013.01); *F02K 9/64* (2013.01)

(58) Field of Classification Search
CPC ... F02K 9/00; F02K 9/46; F02K 9/563; F02K 9/60; F02K 9/62; F02K 9/64; F02K 9/66; F02K 99/00; F23R 7/00
See application file for complete search history.

(56) References Cited

U.S. PATENT DOCUMENTS

| | | | |
|---|---|---|---|
| 4,073,138 A | 2/1978 | Beichel | |
| 2003/0046923 A1 | 3/2003 | Dressler et al. | |
| 2009/0293448 A1* | 12/2009 | Grote | F02K 9/64 60/204 |
| 2011/0005193 A1* | 1/2011 | Pavia | F02K 9/972 60/206 |
| 2012/0060464 A1* | 3/2012 | Grote | F02K 9/972 60/206 |
| 2017/0146244 A1 | 5/2017 | Kurosaka et al. | |
| 2018/0038316 A1 | 2/2018 | Balepin | |

* cited by examiner

*Primary Examiner* — Scott J Walthour
(74) *Attorney, Agent, or Firm* — Osha Bergman Watanabe & Burton LLP

(57) ABSTRACT

A rocket engine system including a thrust chamber including walls that define an interior surface and a combustion section which is fluidically coupled to an output section. A coolant source containing a coolant. A means of heating the coolant. At least one port configured to apply the coolant to the interior surface to achieve a film cooling of the interior surface and wherein the coolant source is fluidically coupled to the means of heating and the at least one port.

26 Claims, 6 Drawing Sheets

(a) Continuous Injection (b) Slot Injection

ROCKET ENGINE SYSTEMS WITH A SUPERCRITICAL COOLANT

CROSS-REFERENCE TO RELATED APPLICATIONS

This application is a Continuation-in-Part of, and claims priority to and benefit of co-pending U.S. patent application Ser. No. 17/561,621, filed on Dec. 23, 2021, entitled "ROCKET ENGINE SYSTEMS WITH A SUPERCRITICAL COOLANT" by Andrew Thomas Duggleby, and assigned to the assignee of the present application, the disclosure of which is incorporated herein by reference in its entirety.

U.S. non-Provisional patent application Ser. No. 17/561, 621 claims priority to and the benefit of U.S. Provisional Patent Application 63/130,586, filed on Dec. 24, 2020, entitled "ROCKET ENGINE SYSTEMS WITH A SUPERCRITICAL COOLANT" by Andrew Thomas Duggleby and assigned to the assignee of the present application, the disclosure of which is incorporated herein by reference in its entirety.

BACKGROUND

The present invention relates generally to rockets, rocket engines, and cooling systems relating to rocket pump motors and rocket engines. More specifically, various embodiments of the present invention relate to improved rocket engine systems with a cooling system.

SUMMARY

Various embodiments of the present invention relate to rocket engine systems with improved cooling.

In one embodiment, a rocket engine and cooling system include a coolant source for providing a coolant, a propellant source, a pressurization system, and a heat exchanger. In some embodiments, one or more of the coolant source and the propellant source is in operative communication with the pressurization system and the rocket engine such that the coolant can be pressurized and then heated by a heat exchanger. In various embodiments, the coolant is heated to a temperature and pressure such that the coolant is at a supercritical state. In various embodiments, the coolant is heated to a temperature and pressure which is below the temperature or pressure at which the coolant reaches a supercritical state. In various embodiments, the coolant is heated to a temperature and pressure which is above the temperature or pressure at which the coolant reaches a supercritical state.

In one embodiment, the propellant source includes one or more of a fuel, an oxidizer, and a coolant. In various embodiments, the oxidizer may be pre-mixed with the fuel, and the coolant.

In various embodiments, the coolant may be a fuel, an oxidizer, or an inert coolant.

In various other embodiments, the rocket engine and cooling system includes a cooling system with a coolant source for providing coolant, a fuel system with a fuel source for providing fuel, an oxidizer system with an oxidizer source for providing an oxidizer, a propellant pressurizing system with a pressurization source for pressurizing the propellant, and a heat exchanger. In various embodiments, the pressurization source communicates with the coolant after the coolant passes through the rocket engine and the heat exchanger. One such embodiment is referred to herein as an expander cycle.

In some embodiments, the improved rocket engine system includes a cooling system with a coolant source for providing coolant, a fuel system with a fuel source for providing fuel, an oxidizer system with an oxidizer source for providing an oxidizer, a propellant pressurizing system with a pressurization source for pressurizing the propellant, and a heat exchanger. In some embodiments, the pressurization source communicates with the coolant after the coolant passes through the rocket engine and the heat exchanger (e.g., an expander cycle), and an aerospike nozzle which is cooled by the coolant after the coolant has powered the pressurization system.

Some embodiments of the present invention include a cooling system with a coolant source for providing coolant, a fuel system with a fuel source for providing fuel, an oxidizer system with an oxidizer source for providing an oxidizer, a propellant pressurizing system with a propellant pressurizing source for pressuring the propellant, and a preburner. In one such embodiment, the pressurization source is driven by the coolant after the coolant passes through the rocket engine and heat exchanger (e.g., an expander cycle). The preburner is used to achieve a side combustion reaction between the fuel and the oxidizer wherein the coolant is heated to a temperature and pressure such that the coolant is at a supercritical state. In various embodiments, the preburner is used to achieve a side combustion reaction between the fuel and the oxidizer wherein the coolant is heated to a temperature and pressure which is below the temperature or pressure at which the coolant reaches a supercritical state. In various embodiments, the preburner is used to achieve a side combustion reaction between the fuel and the oxidizer wherein the coolant is heated to a temperature and pressure which is above the temperature or pressure at which the coolant reaches a supercritical state.

BRIEF DESCRIPTION OF THE DRAWINGS

These and other characteristics of the present invention will be more fully understood by reference to the following detailed description in conjunction with the attached drawings, in which.

DETAILED DESCRIPTION OF EMBODIMENTS

Figure 1:
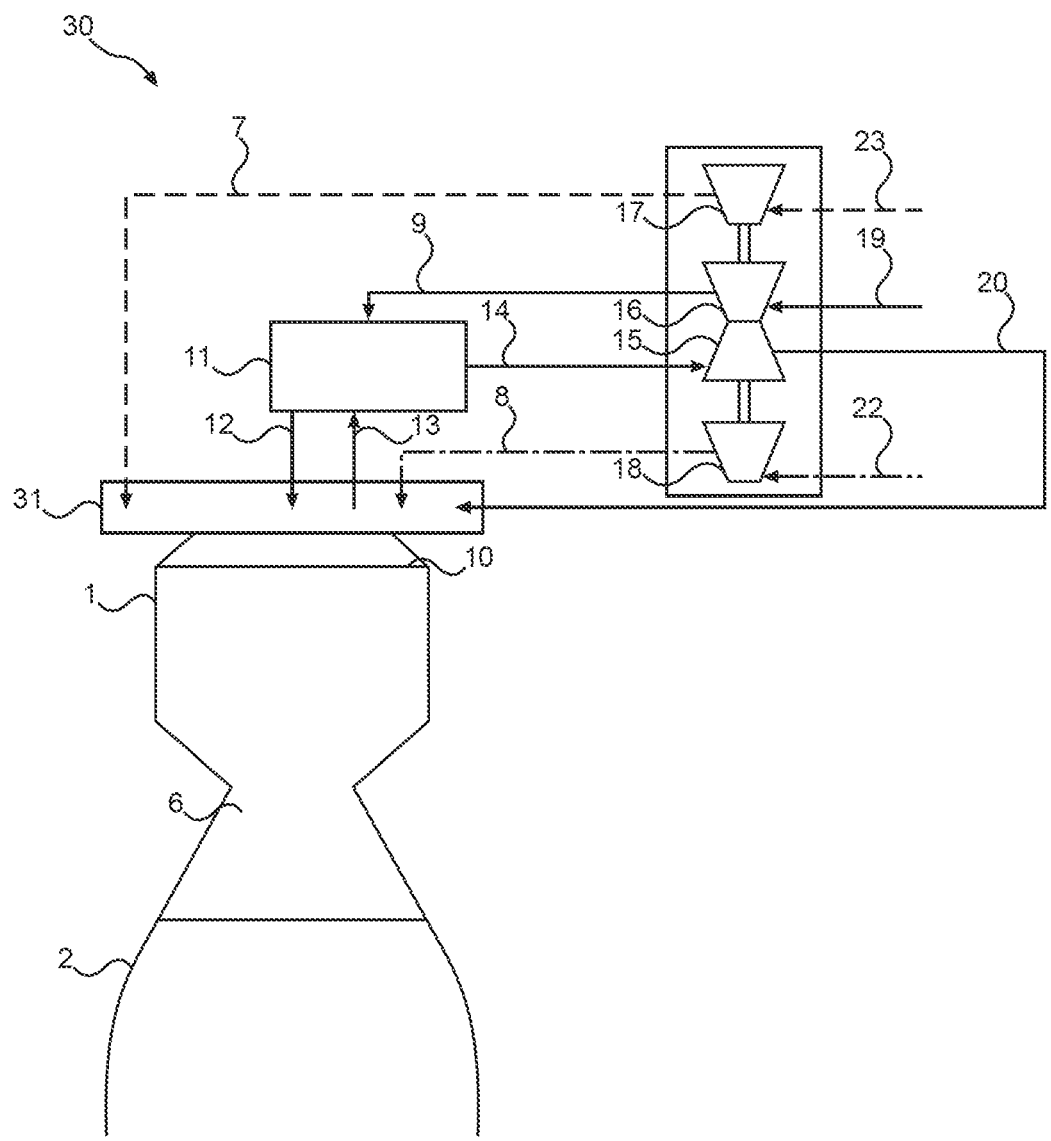
FIG. 1 is a detailed schematic view of an embodiment of an improved rocket engine system wherein the coolant is heated to a temperature and pressure such that the coolant is at a supercritical state, or the coolant is heated to a temperature or pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 1 schematically depicts a coolant source, a fuel source, an oxidizer source, a pressurization system, a heat exchanger, and rocket engine, in accordance with embodiments of the present invention.

Referring now to FIGS. 1-4, in various embodiments, the present invention is an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention. A person of ordinary skill in the art will understands that the flow circuit shown in the various Figures is simplified so as not to obscure the invention with unnecessary detail. Additionally, it will further be understood by those of ordinary skill in the art that there are also a number of valves, ancillary lines, and by-pass pathways, which may not be shown in the Figures so as not to obscure the invention with unnecessary detail.

In various embodiments of the present invention, the coolant is solely or partially composed of, for example, non-reacting materials. Such non-reacting materials include, but are not limited to, for example, carbon dioxide ($CO_2$), nitrous oxide ($N_2O$), nitrogen ($N_2$), or water ($H_2O$). In various embodiments of the present invention, the coolant is solely or partially composed of, for example, reacting materials. Such reacting materials include, but are not limited to, for example, peroxide ($H_2O_2$), ammonia ($NH_3$), or propane ($C_3H_8$).

In various embodiments of the present invention, when the coolant is solely or partially composed of water, several advantages are realized. For example, when using water as a coolant, the presence of water will beneficially reduce or slow down the reaction kinetics of the fuel and the oxidizer thereby improving the performance of the rocket engine. Such a benefit is particularly important in detonation rocket engines as the reduction in the reaction kinetics enables more efficient mixing and subsequent detonation of, for example, the fuel and the oxidizer. Additionally, as the density of water is greater than the density of most conventional coolants, a given mass of water can be stored in a smaller (and correspondingly lighter) tank than is required to store the same mass of less-dense conventional coolants. Furthermore, the higher density of water compared to the density of conventional coolants results in an improved specific impulse when using water compared to the specific impulse corresponding to the use of less-dense conventional coolants. Also, water is much more readily available, much less toxic, and much less expensive than the availability, toxicity and cost of many conventional coolants.

It should be noted that water can be used as the coolant in various embodiments of the present invention described below. It should further be noted that the following description of the various embodiments of the present invention are well suited, but not limited to, the various non-reacting materials and/or reacting coolants listed above.

Referring now to FIG. 1, in various embodiments of the present invention, the rocket engine system uses propellant that includes a fuel source stored in a vehicle or other structure coupled with the rocket engine. The fuel is delivered to the engine via the fuel feedline 23. An oxidizer source stored in the vehicle or other structure coupled to the rocket engine, delivers the oxidizer to the engine via the oxidizer feedline 22. Also, FIG. 1, schematically depicts a coolant source stored in a vehicle or other structure coupled with the rocket engine. The coolant is delivered to the engine via the coolant feedline 19. The coolant source is in communication with a pressurization system. In various embodiments, the present invention includes a turbine 15, coolant pump 16, fuel pump 17, and oxidizer pump 18. In various embodiments, the coolant pump 16 is in communication with a heat exchanger 11 via, for example, a high-pressure coolant line 9. In various embodiments, the fuel pump 17 is in communication with the injector manifold 10 through, for example, a fuel high-pressure fuel line 7. In various embodiments, the oxidizer pump 18 is in communication with the injector manifold 10 through, for example, a high-pressure oxidizer line 8.

In various embodiments of the present invention, the coolant temperature is increased in the heat exchanger 11 to a temperature and pressure such that the coolant is at a supercritical state (herein referred to as supercritical coolant). In various embodiments of the present invention, the coolant temperature is increased in the heat exchanger 11 to a temperature and pressure which is above the temperature or pressure at which the coolant is at a supercritical state (herein referred to as above-supercritical coolant). In various embodiments of the present invention, the coolant temperature is increased in the heat exchanger 11 to a temperature and pressure which is below the temperature or pressure at which the coolant is at a supercritical state (herein referred to as sub-supercritical coolant).

In various embodiments of the present invention, supercritical coolant is then in communication with coolant channels built into the outer wall 4 via, for example, a coolant heat exchanger outlet line 12. In one embodiment, the supercritical state is temperature and pressure just into the supercritical regime of the coolant used. For example, if water is used as the supercritical coolant, the temperature may be raised to between 374-392° C., and the pressure to between 220-231 bar. The coolant may thus be raised to a just-supercritical state, just above the critical pressure and temperature, where there is a significant increase in convective heat transfer due to the lower viscosity and higher conductivity of the fluid. The internal coolant channels are integrated into the wall via manifolds and passages as those skilled in the art are familiar with. The coolant cools the engine walls including the throat 6 and portion of the nozzle 2 before returning to the heat exchanger 11 via the hot coolant inlet 13. The coolant after exchanging heat with the incoming coolant, exits the heat exchanger 11 and enters the coolant turbine 15 via the hot coolant heat exchanger outlet 14. After the coolant provides the power for the pressurization system, the coolant enters the injector manifold 10 via the turbine outlet line 20, and enters the combustion chamber 1 with the fuel and propellant and exits the rocket engine through the throat 6.

In other embodiments of the present invention, sub-supercritical coolant is in communication with coolant channels built into the outer wall 4 via, for example, a coolant heat exchanger outlet line 12. For example, if water is used as the sub-supercritical coolant, the temperature may be raised to below 374-392° C., and/or the pressure is below between 220-231 bar such that the sub-supercritical coolant is, by the time it reaches the most critical point of the cooling passages (e.g., in a RDRE, abeam the detonation wave), raised to a just-supercritical state, just above the critical pressure and temperature, where there is a significant increase in convective heat transfer due to the lower viscosity and higher conductivity of the fluid. The internal coolant channels are integrated into the wall via manifolds and passages as those skilled in the art are familiar with. The coolant cools the engine walls including the throat 6 and portion of the nozzle 2 before returning to the heat exchanger 11 via the hot coolant inlet 13. The coolant after exchanging heat with the incoming coolant, exits the heat exchanger 11 and enters the coolant turbine 15 via the hot coolant heat exchanger outlet 14. After the coolant provides the power for the pressurization system, the coolant enters the injector manifold 10 via the turbine outlet line 20, and enters the combustion chamber 1 with the fuel and propellant and exits the rocket engine through the throat 6.

In other embodiments of the present invention, above-supercritical coolant is in communication with coolant channels built into the outer wall 4 via, for example, a coolant heat exchanger outlet line 12. For example, if water is used as the sub-supercritical coolant, the temperature may be raised to above 374-392° C., and/or the pressure is above between 220-231 bar. In such an embodiment, the above-supercritical coolant. The internal coolant channels are integrated into the wall via manifolds and passages as those skilled in the art are familiar with. The coolant cools the engine walls including the throat 6 and portion of the nozzle 2 before returning to the heat exchanger 11 via the hot coolant inlet 13. The coolant after exchanging heat with the incoming coolant, exits the heat exchanger 11 and enters the coolant turbine 15 via the hot coolant heat exchanger outlet 14. After the coolant provides the power for the pressurization system, the coolant enters the injector manifold 10 via the turbine outlet line 20 and enters the combustion chamber 1 with the fuel and propellant and exits the rocket engine through the throat 6.

Figure 2:
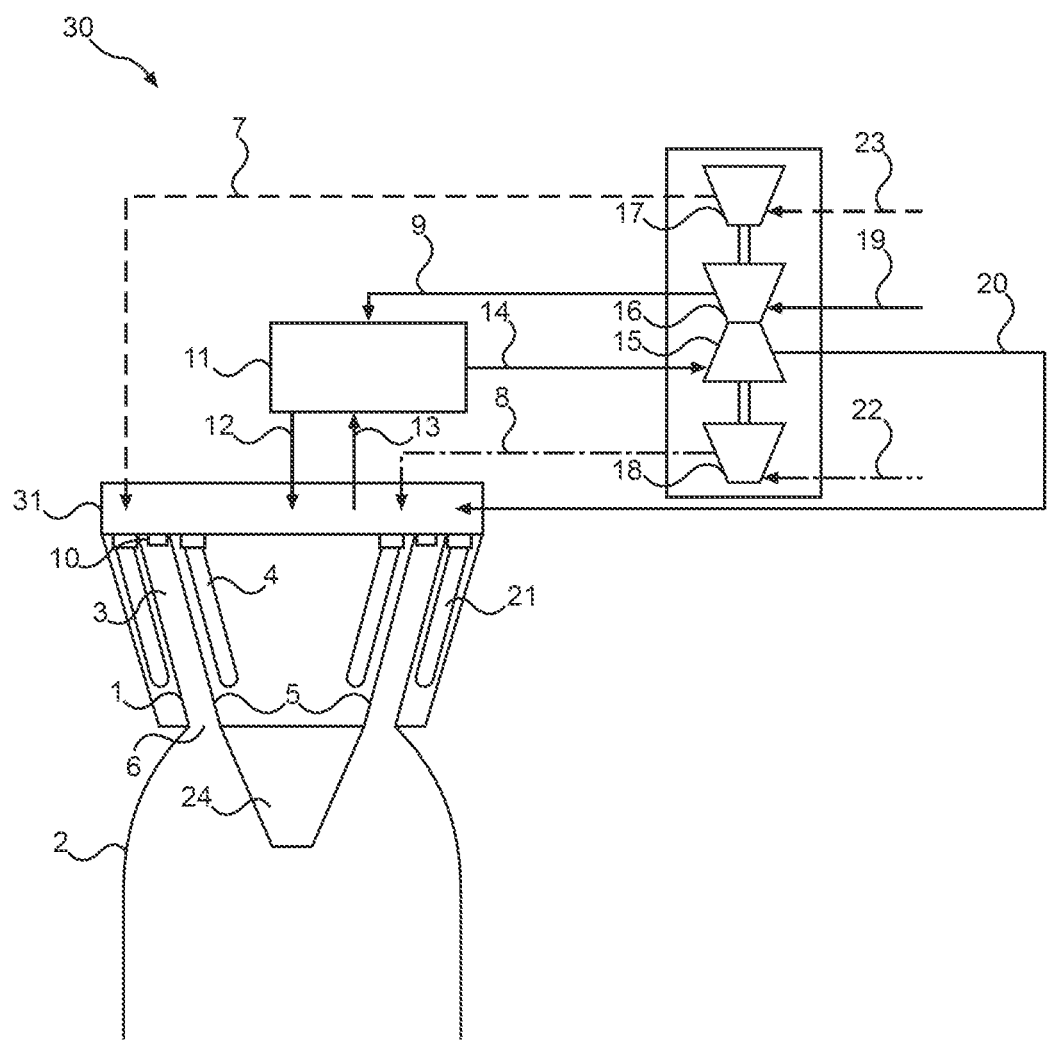
FIG. 2 is a detailed schematic view of an embodiment of an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 2 schematically depicts a coolant source, a fuel source, an oxidizer source, a pressurization system, a heat exchanger, and rocket engine with an aerospike nozzle, in accordance with embodiments of the present invention.

Referring to FIG. 2, in various embodiments, the rocket engine system includes an aerospike nozzle 24 such that the combustion happens in an annulus 3 contained by an inner cowl 5 and outer cowl 1. In various embodiments, the aerospike nozzle 24 may also be any altitude-compensating nozzle, such as, but not limited to, a plug nozzle, an expanding nozzle, a single expansion ramp nozzle, a stepped nozzle, an expansion deflection nozzle, or an extending nozzle.

In various embodiments, for example, where the rocket engine system has an aerospike nozzle and the rocket engine is a rotating detonation rocket engine and there is an increased yet localized heat load near the injection point, the sub-supercritical coolant is introduced to the rocket engine at the area of localized heat load such that the sub-supercritical coolant heated to a supercritical state by the area of localized heat load to augment cooling of the rocket engine.

In various embodiments of the present invention, there are coolant channels 4 in the inner cowl 5 and coolant channels 21 in the outer cowl 1. Coolant (supercritical coolant, sub-supercritical coolant or above-supercritical coolant) from the heat exchanger outlet 12 first cools the inner cowl 5 via coolant channels 4 before returning to the heat exchanger 11 via the hot coolant heat exchanger inlet 13 as "hot coolant". The hot coolant, after exchanging heat with the incoming coolant, exits the heat exchanger 11 and enters the coolant turbine 15 via the hot coolant heat exchanger outlet 14. After the turbine 15 the coolant returns to the aerospike engine and cools the outer cowl 1 via coolant channels 21. The coolant channels 4 and 21 are integrated into the cowls via manifolds and passages as those skilled in the art are familiar with. After the coolant provides the power for the pressurization system, the coolant enters the injector manifold 10 via the turbine outlet line 20, and enters the combustion chamber annulus 3 with the fuel and propellant and exits the rocket engine through the throat 6.

Figure 3:
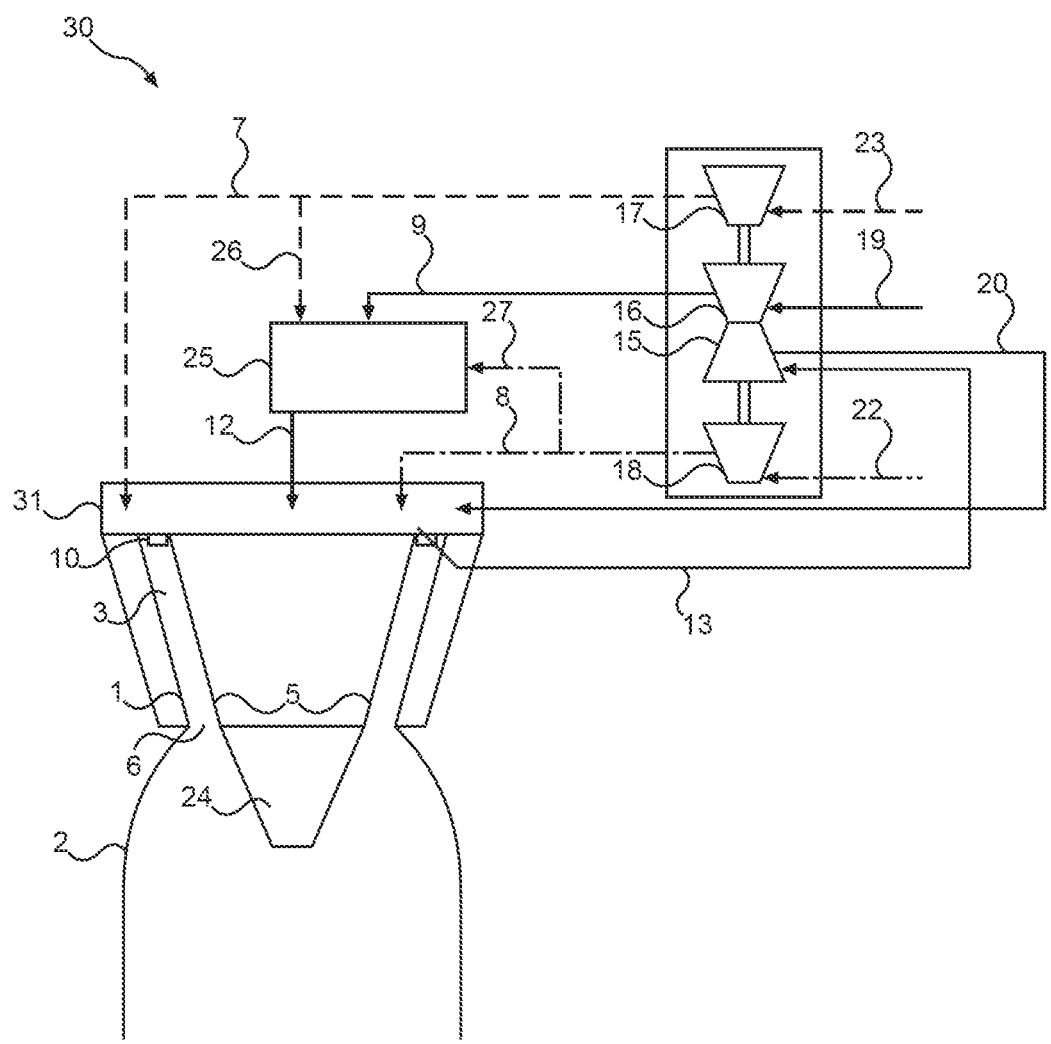
FIG. 3 is a detailed schematic view of an embodiment of an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 3 schematically depicts a coolant source, a fuel source, an oxidizer source, a pressurization system, a preburner, and a rocket engine with an aerospike nozzle, in accordance with embodiments of the present invention.

Referring now to FIG. 3, in various embodiments of the present invention, the rocket engine system uses a preburner 25 to add heat to the coolant (supercritical coolant, sub-supercritical coolant or above-supercritical coolant), completely or temporarily, for example just for startup, replacing or contributing to a heat exchanger. In various embodiments, fuel is diverted to the preburner from the high-pressure fuel line 7 via the fuel preburner inlet 26, and oxidizer is diverted to the preburner from the high-pressure oxidizer line 8 via the oxidizer preburner inlet 27.

Figure 4:
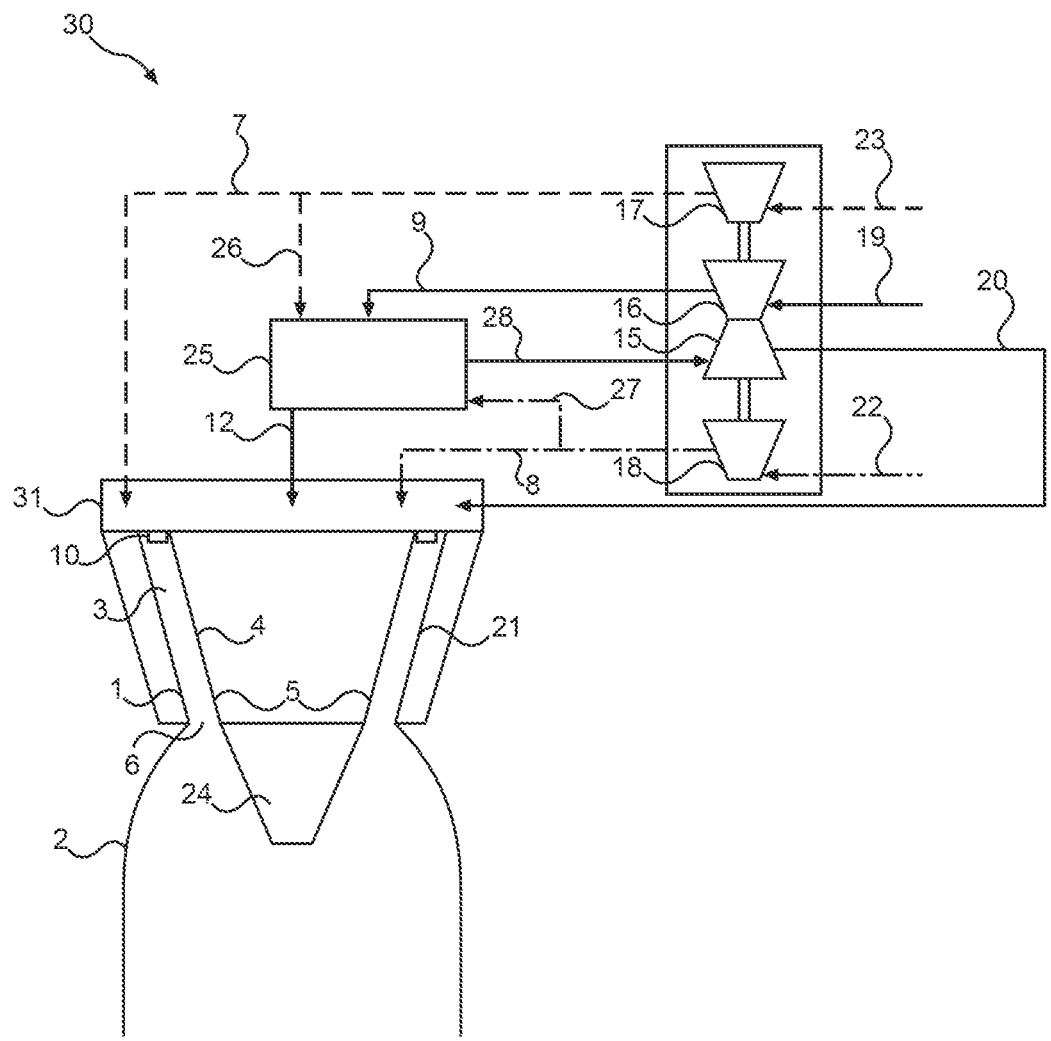
FIG. 4 is a detailed schematic view of an embodiment of an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 4 schematically depicts a coolant source, a fuel source, an oxidizer source, a pressurization system, a preburner in an alternate configuration, and rocket engine with an aerospike nozzle, in accordance with embodiments of the present invention.

Referring now to FIG. 4, in various embodiments of the present invention, the rocket engine system uses a preburner 25 that powers the pressurization system and then is mixed with the coolant (supercritical coolant, sub-supercritical coolant or above-supercritical coolant) in the preburner 25 before powering the turbopump 15 via the turbine inlet line 28 before cooling the rocket engine via the engine coolant line 20.

Figure 5:
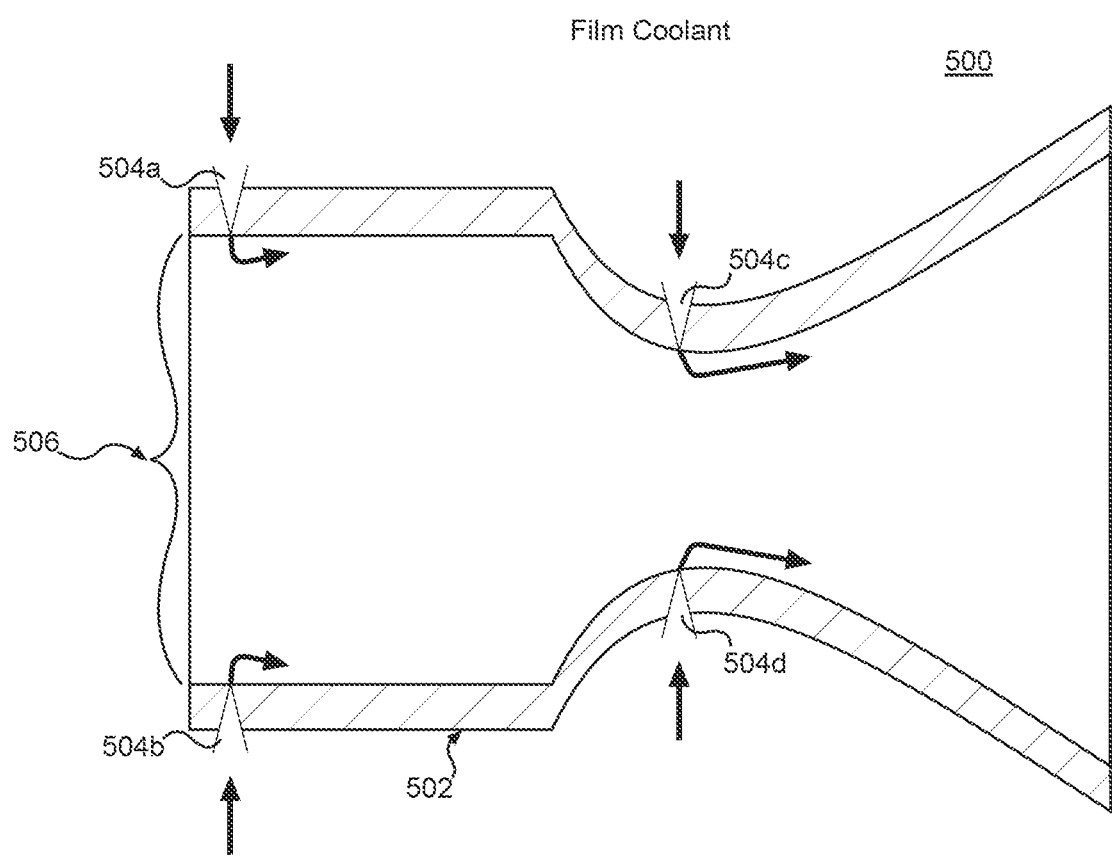
FIG. 5 is a schematic cut-away view of an embodiment of an improved rocket engine system wherein the coolant is applied to the rocket engine to achieve film cooling of the rocket engine, in accordance with embodiments of the present invention.

Referring now to FIG. 5, a schematic cut-away view 500 is provided depicting an embodiment of an improved rocket engine system. As shown in FIG. 5, coolant is applied to the rocket engine 502 to achieve film cooling of rocket engine 502, in accordance with embodiments of the present invention. In one embodiment of the present invention, the coolant is water. More specifically, in one embodiment, the water is applied to the interior surface of rocket engine 502.

In various embodiments, by applying the water to the interior surface of rocket engine 502, the water provides film cooling and also provides a protective barrier to the interior surface of rocket engine 502. By providing a protective barrier, embodiments of the present invention produce a more reliable rocket engine. Specifically, the protective barrier provided by the present film cooling embodiments reduces the frequency to inspect, or even the need to replace, the combustion wall chambers of rocket engine 502. Hence, embodiments of the present invention are well suited to use with re-usable rocket engines. That is, the various embodiments of the present invention can extend the life of a re-usable rocket, and/or increase the number times that re-usable rocket can be used.

Referring again to FIG. 5, as mentioned above, because the density of water is greater than the density of most conventional coolants, in various embodiments of the present invention, a given mass of water can be stored in a smaller (and correspondingly lighter) tank than is required to store the same mass of less-dense conventional coolants. Furthermore, as the higher density of water is greater than the density of many conventional coolants, embodiments of the present invention achieve in an improved specific impulse compared to the specific impulse corresponding to the use of less-dense conventional coolants (e.g., fuel, which is generally used in all rocket engines employing film cooling to date). Also, water coolant, as used in various embodiments of the present invention, is more readily available, less toxic, and less expensive than the availability, toxicity and cost of many conventional coolants.

Referring still to FIG. 5, in various embodiments, the water is applied to the interior surface of rocket engine 502 at, or proximate, the combustion chamber 506. As stated previously, when using water as a coolant, the presence of water will beneficially reduce or slow down the reaction kinetics of the fuel and the oxidizer in combustion chamber 506, thereby improving the performance of rocket engine 502. Such a benefit is particularly important in detonation rocket engines as the reduction in the reaction kinetics enables more efficient mixing and subsequent detonation of, for example, the fuel and the oxidizer in the combustion chamber thereof.

Figure 6:
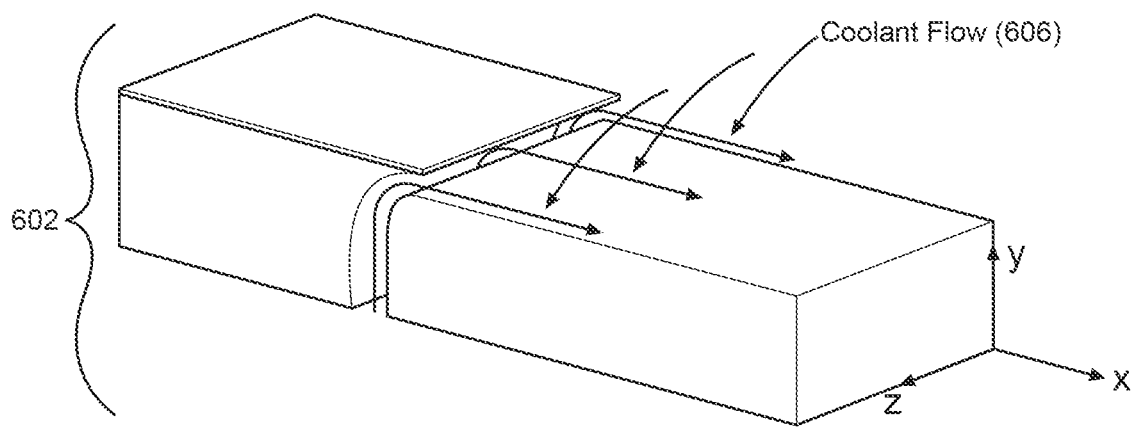
FIG. 6 is a perspective view of a continuous injection port and a slot injection port used to apply coolant to achieve film cooling of a rocket engine, in accordance with embodiments of the present invention.
Figure 6:
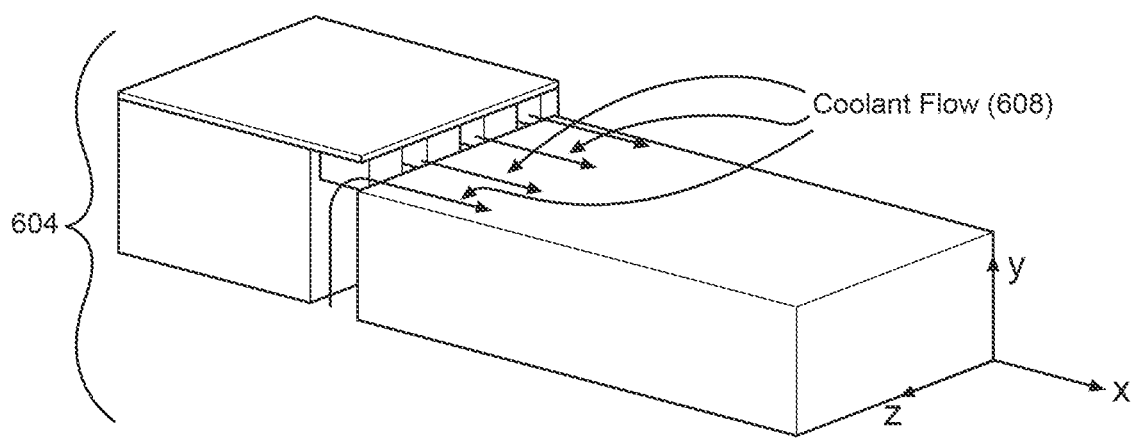

Still referring to FIG. 5, various ports 504*a* and 504*b* are located at, or proximate, the combustion chamber 506. FIG. 5 further depicts ports 504*c* and 504*d*. FIG. 6, to be discussed below, provides a detailed depiction of exemplary port configurations used in accordance with various embodiments of the present invention. Returning to FIG. 5, the water is applied to the interior surface of rocket engine 502 using one or more of ports 504*a*, 504*b*, 504*c* and 504*d*. Additionally, it should be noted that the various embodiments of the present invention are well suited to having a greater or lesser number of ports. The various embodiments of the present invention are also well suited to having the ports disposed at locations other than the locations depicted in FIG. 5.

Referring again to FIG. 5, it should be further noted that the film cooling embodiments corresponding to FIG. 5 are also well suited to being used in combination with any of the interior wall cooling embodiments described in detail above and corresponding to FIGS. 1-4. Furthermore, the film cooling embodiments of FIG. 5 are also well suited to being used in combination with ablative layers or other rocket engine cooling methodologies.

Although the above description of the embodiments of FIG. 5 (including the embodiments used in combination with the embodiments pertaining to FIGS. 1-4), specifically describes the use of water as the coolant, those various embodiments are also well suited to use with a coolant which is solely or partially composed of, for example, non-reacting materials other than water. Such non-reacting materials include, but are not limited to, for example, carbon dioxide (CO2), nitrous oxide (N2O) or nitrogen (N2). Additionally, the various embodiments corresponding to FIG. 5 (including the embodiments used in combination with the embodiments pertaining to FIGS. 1-4) are also well suited to use with a coolant which is solely or partially composed of, for example, reacting materials. Such reacting materials include, but are not limited to, for example, peroxide (H2O2), ammonia (NH3), or propane (C3H8).

Referring again to FIG. 5, in various embodiments of the present invention, the water is at a temperature and pressure such that the water is at supercritical state when applied to the interior surface of rocket engine 502. In various other embodiments of the present invention, the water is at a temperature and pressure which is above the temperature or pressure at which the water is at a supercritical state when applied to the interior surface of rocket engine 502. Moreover, in various embodiments of the present invention, the water is at a temperature and pressure which is below the temperature or pressure at which the coolant is at a supercritical state when applied to the interior surface of rocket engine 502. In such embodiments of the present invention, once the water is applied to the interior surface of the rocket engine, the water temperature or pressure is adjusted (i.e., increased or decreased) such that the temperature and pressure of the water corresponds to the supercritical state for water. For example, when water is introduced to the interior surface of rocket engine 502, at a sub-supercritical state or an above-supercritical state, the temperature of the water is adjusted, by the interior surface of rocket engine 502, to a range of approximately 374-392° C., and/or the pressure is adjusted to a pressure of between 220-231 bar. In such an embodiment, the temperature and pressure of the water is thus adjusted to a supercritical state, where there is a significant increase in convective heat transfer due to the lower viscosity and higher conductivity of water when in a supercritical state.

Referring again to FIG. 5, in various embodiments, such as, for example, where the rocket engine system has an aerospike nozzle and the rocket engine is a rotating detonation rocket engine and there is an increased yet localized heat load near the injection point, the embodiments of the present invention inject the water onto the interior surface of rocket engine 502 at the area of localized heat to augment cooling of rocket engine 502.

With reference now to FIG. 6, a perspective view is provided of a continuous injection port 602 and a slot injection port 604 used to apply coolant (e.g., but not limited to, water) to the interior surface of rocket engine 502 (of FIG. 5), as described in conjunction with the embodiments of FIG. 5. As shown in FIG. 6, continuous injection port 602 is configured to distribute a substantially continuous stream of coolant, such as, but not limited to, water, onto the interior surface of rocket engine 502. Arrows 606 depict the flow direction of coolant along the interior surface of rocket engine 502. Similarly, in FIG. 6, slot injection port 604 is configured to distribute a non-continuous stream of coolant, such as, but not limited to, water, onto the interior surface of rocket engine 502. Arrows 608 depict the flow direction of coolant along the interior surface of rocket engine 502. Although a continuous injection port 602 and a slot injection port 604 are shown in FIG. 6, embodiments of the present invention are well suited to use with various other features, ports, and port shapes, types and configurations to enable the application of a coolant, such as, but not limited to, water, onto the interior surface of rocket engine 502.

CONCLUSION, RAMIFICATIONS, AND SCOPE

The convection heat flux, $q=h\Delta T$, into the coolant is proportional to the convection coefficient hand temperature difference, $\Delta T = Tcombustion - Tcoolant$. In a supercritical state, the convection coefficient, h, increases significantly due to decreased viscosity and increased thermal conductivity of the coolant. The total heat transfer increases, even though the coolant temperature, Tcoolant, has increased giving a subsequent decrease in $\Delta T$. Thus, the rocket engine can be cooled much more effectively and efficiently.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A rocket engine system comprising:
   a thrust chamber including walls that define an interior surface and a combustion section which is fluidically coupled to an output section;
   a coolant source containing a coolant;
   a heat exchanger configured to:
      receive a first flow of said coolant at a first temperature at a first heat exchanger inlet;
      direct said first flow of said coolant through a first coolant outlet line to said thrust chamber;
      receive a second flow of said coolant at a second temperature returned from said thrust chamber via a second heat exchanger inlet;
      exchange heat between said second flow of said coolant at said second temperature and said first flow of said coolant at said first temperature; and
      direct said second flow of said coolant through a second coolant outlet line to at least one port connected to said interior surface of said thrust chamber;
   wherein said heat exchanger is disposed at a distance from the thrust chamber, said heat exchanger being connected to said thrust chamber by said first coolant outlet line and said second coolant outlet line;
   wherein said at least one port is configured to apply said coolant to said interior surface to achieve a film cooling of said interior surface.

2. The rocket engine system of claim 1, wherein said coolant provides a protective barrier to said interior surface when applied to said interior surface.

3. The rocket engine system of claim 1, wherein said at least one port is disposed to apply said coolant to said interior surface proximate said combustion section.

4. The rocket engine system of claim 1, wherein said coolant is comprised of a non-reacting material.

5. The rocket engine system of claim 1, wherein said coolant is comprised of a reacting material.

6. The rocket engine system of claim 1, wherein said coolant is comprised of a non-reacting material selected from the group consisting of: carbon dioxide ($CO_2$), nitrous oxide ($N_2O$), nitrogen ($N_2$), and water ($H_2O$).

7. The rocket engine system of claim 1, wherein said coolant is comprised of a reacting material selected from the group consisting of: peroxide ($H_2O_2$), ammonia ($NH_3$), and propane ($C_3H_8$).

8. The rocket engine system of claim 1, wherein said heat exchanger is further configured to raise the first temperature of said coolant to a sub-supercritical state.

9. The rocket engine system of claim 1, wherein said heat exchanger is further configured to raise the first temperature of said coolant to a supercritical state.

10. The rocket engine system of claim 1, wherein said coolant is not at a supercritical state immediately prior to being applied to said interior surface and said coolant is adjusted to a supercritical state upon application to said interior surface.

11. The rocket engine system of claim 1, wherein said walls further comprise: at least one cooling passage formed therein; and wherein said coolant source is coupled to said at least one cooling passage.

12. The rocket engine system of claim 11, wherein said coolant is also provided to said at least one cooling passage to achieve wall cooling of said rocket engine system.

13. The rocket engine system of claim 1, wherein said at least one port comprises a slot injection port.

14. The rocket engine system of claim 1, further comprising an injector manifold disposed at a distance from said heat exchanger and fluidically coupled to said heat exchanger by said second coolant outlet line, said injector manifold configured to inject said coolant and a fuel into said thrust chamber for a combustion reaction.

15. The rocket engine system of claim 1, further comprising a coolant turbine, the coolant turbine configured to: receive said second flow of said coolant from said second coolant outlet line of said heat exchanger; and provide power to a pressurization system of the rocket engine system.

16. A rocket engine system comprising:
   a thrust chamber including walls that define an interior surface and a combustion section which is fluidically coupled to an output section;
   a coolant source containing water;
   a heat exchanger configured to:
      receive a first flow of said water at a first temperature at a first heat exchanger inlet;
      direct said first flow of said water through a first coolant outlet line to said thrust chamber;
      receive a second flow of said water at a second temperature returned from said thrust chamber via a second heat exchanger inlet;
      exchange heat between said second flow of said water at said second temperature and said first flow of said water at said first temperature; and
      direct said second flow of said water through a second coolant outlet line to at least one port connected to said interior surface of said thrust chamber;
   wherein said heat exchanger is disposed at a distance from the thrust chamber, said heat exchanger being connected to said thrust chamber by said first coolant outlet line and said second coolant outlet line;

wherein said at least one port is configured to apply said water to said interior surface to achieve a film cooling of said interior surface.

17. The rocket engine system of claim 16, wherein said water provides a protective barrier to said interior surface when applied to said interior surface.

18. The rocket engine system of claim 16, wherein said at least one port is disposed to apply said water to said interior surface proximate said combustion section.

19. The rocket engine system of claim 16, wherein said heat exchanger is further configured to raise the first temperature of said water to a sub-supercritical state.

20. The rocket engine system of claim 16, wherein said heat exchanger is further configured to raise the first temperature of said water to a supercritical state.

21. The rocket engine system of claim 16, wherein said water is not at a supercritical state immediately prior to being applied to said interior surface and said water is adjusted to a supercritical state upon application to said interior surface.

22. The rocket engine system of claim 16, wherein said walls further comprise: at least one cooling passage formed therein; and wherein said coolant source is coupled to said at least one cooling passage.

23. The rocket engine system of claim 22, wherein said water is also provided to said at least one cooling passage to achieve wall cooling of said rocket engine system.

24. The rocket engine system of claim 16, wherein said at least one port comprises a slot injection port.

25. The rocket engine system of claim 16, further comprising an injector manifold disposed at a distance from said heat exchanger and fluidically coupled to said heat exchanger by said second coolant outlet line, said injector manifold configured to inject said water and a fuel into said thrust chamber for a combustion reaction.

26. The rocket engine system of claim 16, further comprising a coolant turbine, the coolant turbine configured to: receive said second flow of said water from said second coolant outlet line of said heat exchanger; and provide power to a pressurization system of the rocket engine system.

\* \* \* \* \*